US012420567B2

(12) United States Patent
Noda et al.

(10) Patent No.: US 12,420,567 B2
(45) Date of Patent: Sep. 23, 2025

(54) PRINTING APPARATUS AND CONTROL METHOD FOR PRINTING APPARATUS

(71) Applicant: BROTHER KOGYO KABUSHIKI KAISHA, Nagoya (JP)

(72) Inventors: Masahiro Noda, Ogaki (JP); Atsushi Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 160 days.

(21) Appl. No.: 18/324,332

(22) Filed: May 26, 2023

(65) Prior Publication Data

US 2023/0382135 A1 Nov. 30, 2023

(30) Foreign Application Priority Data

May 27, 2022 (JP) ................................ 2022-086747

(51) Int. Cl.
*B41J 11/00* (2006.01)

(52) U.S. Cl.
CPC ................................ *B41J 11/00212* (2021.01)

(58) Field of Classification Search
CPC ....................... B41J 11/00212; B41J 11/00214
See application file for complete search history.

(56) References Cited

U.S. PATENT DOCUMENTS

2015/0097887 A1 4/2015 Honobe
2021/0291574 A1* 9/2021 Noda ................ B41J 11/00218

FOREIGN PATENT DOCUMENTS

JP 2015-71254 A 4/2015
JP 2019-123217 A 7/2019
JP 2021-146736 A 9/2021

* cited by examiner

*Primary Examiner* — Bradley W Thies
(74) *Attorney, Agent, or Firm* — Merchant & Gould P.C.

(57) ABSTRACT

There is provided a printing apparatus including a head; an irradiator including a plurality of light source rows; a carriage; and a controller. The controller is configured to: execute a first obtaining operation of obtaining a gap between the irradiator and a printing medium; execute a discharging operation of discharging an ink from the head to the printing medium; execute an irradiating operation of irradiating the ink on the printing medium with a light from the irradiator; and switch off a part of the plurality of light source rows in a case that the gap is a second gap. A number of the plurality of light sources switched on in a case that the gap is a first gap is greater than a number of the plurality of light sources switched on in the case that the gap is the second gap smaller than the first gap.

15 Claims, 6 Drawing Sheets

PRINTING APPARATUS AND CONTROL METHOD FOR PRINTING APPARATUS

REFERENCE TO RELATED APPLICATIONS

This application claims priority from Japanese Patent Application No. 2022-086747 filed on May 27, 2022. The entire content of the priority application is incorporated herein by reference.

BACKGROUND ART

Conventionally, as a printing apparatus, a liquid jetting apparatus including a liquid jetting part configured to jet a liquid of photo curing type to a medium and an irradiating part configured to irradiate the liquid jetted to the medium with a light from a light source so as to cure the liquid, is known.

DESCRIPTION

A liquid jetting apparatus described in Japanese Patent Application Laid Open No. 2015-71254 is configured to make a light intensity of a light from an irradiating part in a case that a distance between the irradiating part and a medium is a first distance larger as compared to the light intensity in a case that the distance is a second distance smaller than the first distance. In such a manner, in a case that the distance is the first distance, the light intensity is made larger to cure the liquid, and thus light source are heated and consequently the light sources are likely to deteriorate (degrade) thermally. In a case that a part of the light sources of the irradiating part is deteriorated thermally, the irradiating part may have to be replaced.

In view of the problem described above, an object of the present disclosure is to provide a printing apparatus and a control method for a printing apparatus capable of prolonging a lifetime of an irradiating part.

According to a first aspect of the present disclosure, there is provided a printing apparatus including:

- a head including a plurality of nozzles configured to discharge an ink having photo-curing property to a printing medium;
- an irradiator including a plurality of light source rows configured to irradiate the ink on the printing medium with a light;
- a carriage configured to move the head and the irradiator in a first direction; and
- a controller.

Each of the plurality of light source rows is constructed by a plurality of light sources aligned in a second direction crossing the first direction.

The plurality of light source rows is arranged in the first direction.

The controller is configured to:

- execute a first obtaining operation of obtaining a gap between the irradiator and the printing medium;
- execute a discharging operation of discharging the ink from the head to the printing medium;
- execute an irradiating operation of irradiating the ink on the printing medium with the light from the irradiator; and
- switch off a part of the plurality of light source rows in the irradiating operation in a case that the gap obtained in the first obtaining operation is a second gap.

A number of the plurality of light sources switched on in the irradiating operation in a case that the gap obtained in the first obtaining operation is a first gap is greater than a number of the plurality of light sources switched on in the irradiating operation in the case that the gap obtained in the first obtaining operation is the second gap smaller than the first gap.

According to a second aspect of the present disclosure, there is provided a control method for a printing apparatus, the printing apparatus including:

- a head including a plurality of nozzles configured to discharge an ink having photo-curing property to a printing medium;
- an irradiator including a plurality of light source rows configured to irradiate the ink on the printing medium with a light;
- a carriage configured to move the head and the irradiator in a first direction; and
- a controller.

Each of the plurality of light source rows is constructed by a plurality of light sources aligned in a second direction crossing the first direction.

The plurality of light source rows is arranged in the first direction.

The method includes:

- causing the controller to execute a first obtaining operation of obtaining a gap between the irradiator and the printing medium;
- causing the controller to execute a discharging operation of discharging the ink from the head to the printing medium;
- causing the controller to execute an irradiating operation of irradiating the ink on the printing medium with the light from the irradiator; and
- causing the controller to switch off a part of the plurality of light source rows in the irradiating operation in a case that the gap obtained in the first obtaining operation is a second gap.

A number of the plurality of light sources switched on in the irradiating operation in a case that the gap obtained in the first obtaining operation is a first gap is greater than a number of the plurality of light sources switched on in the irradiating operation in the case that the gap obtained in the first obtaining operation is the second gap smaller than the first gap.

According to the printing apparatus and a control method for a printing apparatus of the present disclosure, it is possible to prolong a lifetime of the irradiating part.

Above object, other object(s), feature(s) and advantage(s) of the present disclosure will be clarified, with reference to the attached drawings, by a detailed explanation on embodiments described below.

In the following, an embodiment of the present disclosure will be explained concretely, with reference to the drawings. Note that, in the following, same reference signs are used for same elements or corresponding elements throughout all drawings.

First Embodiment

<Printing Apparatus>

Figure 1:
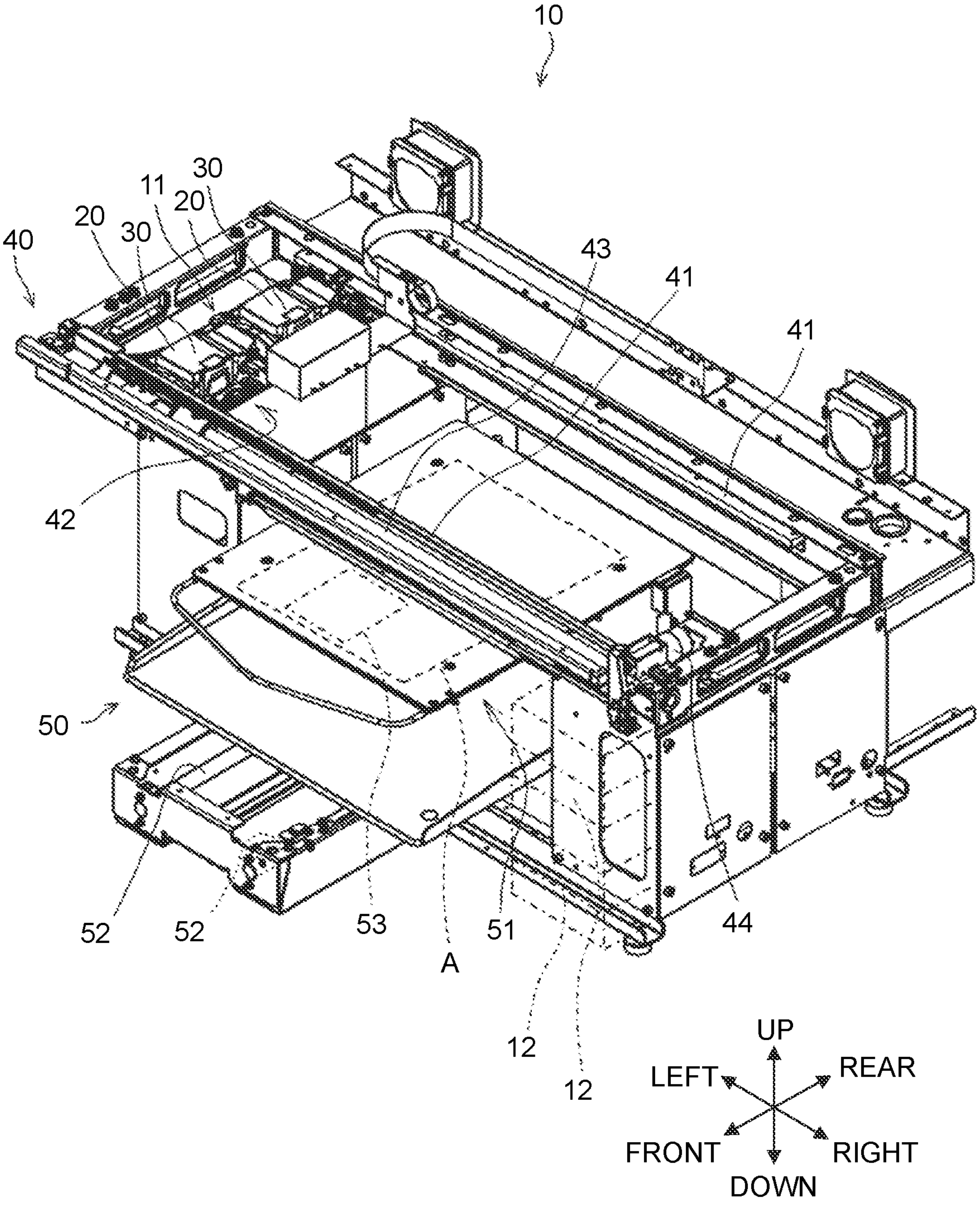
FIG. 1 is a perspective view of a printing apparatus.

A printing apparatus 10 according to the first embodiment is, for example, an ink-jet printer configured to print an image on a printing medium A with an ink by discharging the ink from a head 20 to the printing medium A and irradiating the ink on the printing medium A with a light from an irradiating part 30, as depicted in FIG. 1. Note that the printing apparatus 10 is not limited to ink-jet printers. The printing medium A is, for example, a fabric, a textile, a cloth, a paper, and the like having a sheet shape or, a ball, a mug, and the like having a three-dimensional shape. The ink is a photo-curing ink, such as an ink configured to be cured by a light with which the ink is irradiated, for example.

Figure 2:
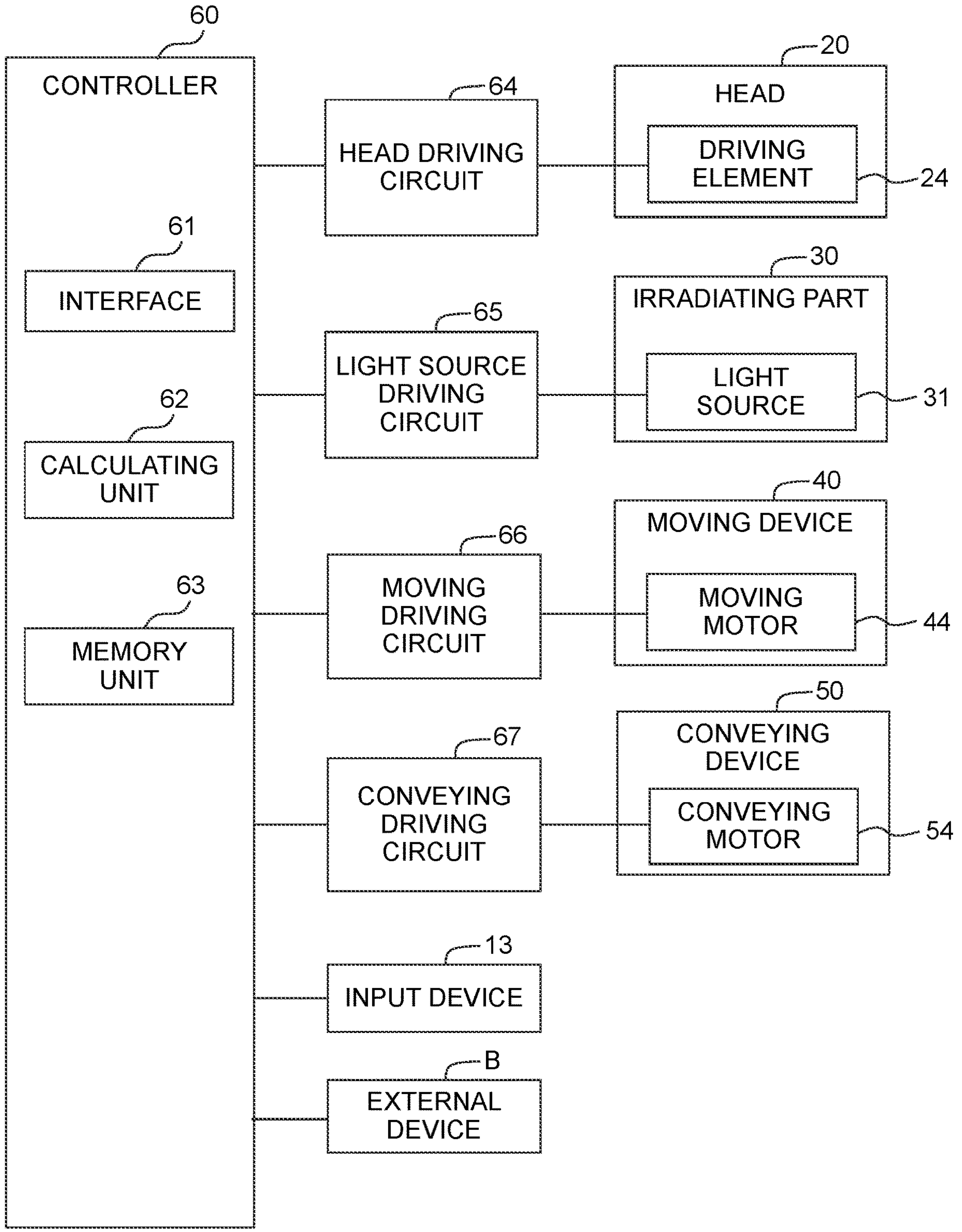
FIG. 2 is a functional block diagram depicting a configuration of the printing apparatus of FIG. 1.

The printing apparatus 10 includes a head unit 11 having the head 20, and the light irradiating part (irradiator) 30, a moving device 40, a conveying device (conveyor) 50, and a controller 60 (FIG. 2). Note that the details of the controller 60 will be described later. A first direction in which the head 20 and the light irradiating part 30 are moved by the moving device is referred to as a left-right direction. A second direction crossing (for example, orthogonal to) the first direction is referred to as a front-rear direction. A direction crossing (for example, orthogonal to) the first and second directions is referred to as an up-down direction. However, an arrangement of the printing apparatus 10 is not limited thereto.

The moving device 40 includes a pair of moving rails 41, a carriage 42, a driving belt 43, and a moving motor 44, and is configured to move the head unit 11 in the left-right direction. The pair of moving rails 41 are each an elongated member extending in the left-right direction, and are arranged parallel to each other so that the head unit 11 is interposed between the pair of moving rails 41 in the front-rear direction. The head unit 11 is mounted on the carriage 42, and the carriage 42 is supported by the pair of moving rails 41 such that the carriage 42 is movable along the pair of moving rails 41 in the left-right direction. The driving belt 43 is an endless belt. The driving belt 43 extends in the left-right direction along the pair of moving rails 41, is connected to the carriage 42, and is connected to the moving motor 44 via pulley(s). If the driving motor 44 drives the driving belt 43, then the carriage 42 will be moved forwardly and backwardly in the left-right direction along the pair of moving rails 41. By doing so, the moving device 40 moves the printing medium A and the head unit 11 in the left-right direction relative to each other.

The conveying mechanism 50 includes a platen 51, a conveying rail 52, a platen support base 53, and a conveying motor 54 (FIG. 2). The upper surface of the platen 51 faces or is opposed to a discharging surface 20*a* (FIG. 3) being the lower surfaces of the head 20, and the lower surface of the irradiating part 30. The platen 51 supports the printing medium A in a state that the printing medium A is placed on the upper surface of the platen 51. The platen 51 defines gaps between the printing medium A and each of the head 20 and the irradiating part 30 in the up-down direction. The conveying rail 52 extends in the front-rear direction. The platen support base 53 supports, for example, the platen 51. The platen support base 53 is supported such that the platen support base 53 is movable along the conveying rail 52 in the front-rear direction. The platen support base 53 is connected to the conveying motor 54. The conveying motor 54 moves the platen 51 in the front-rear direction by driving the platen support base 53. By doing so, the conveying device 50 conveys the printing medium A frontward, for example.

<Head Unit>

Figure 3:
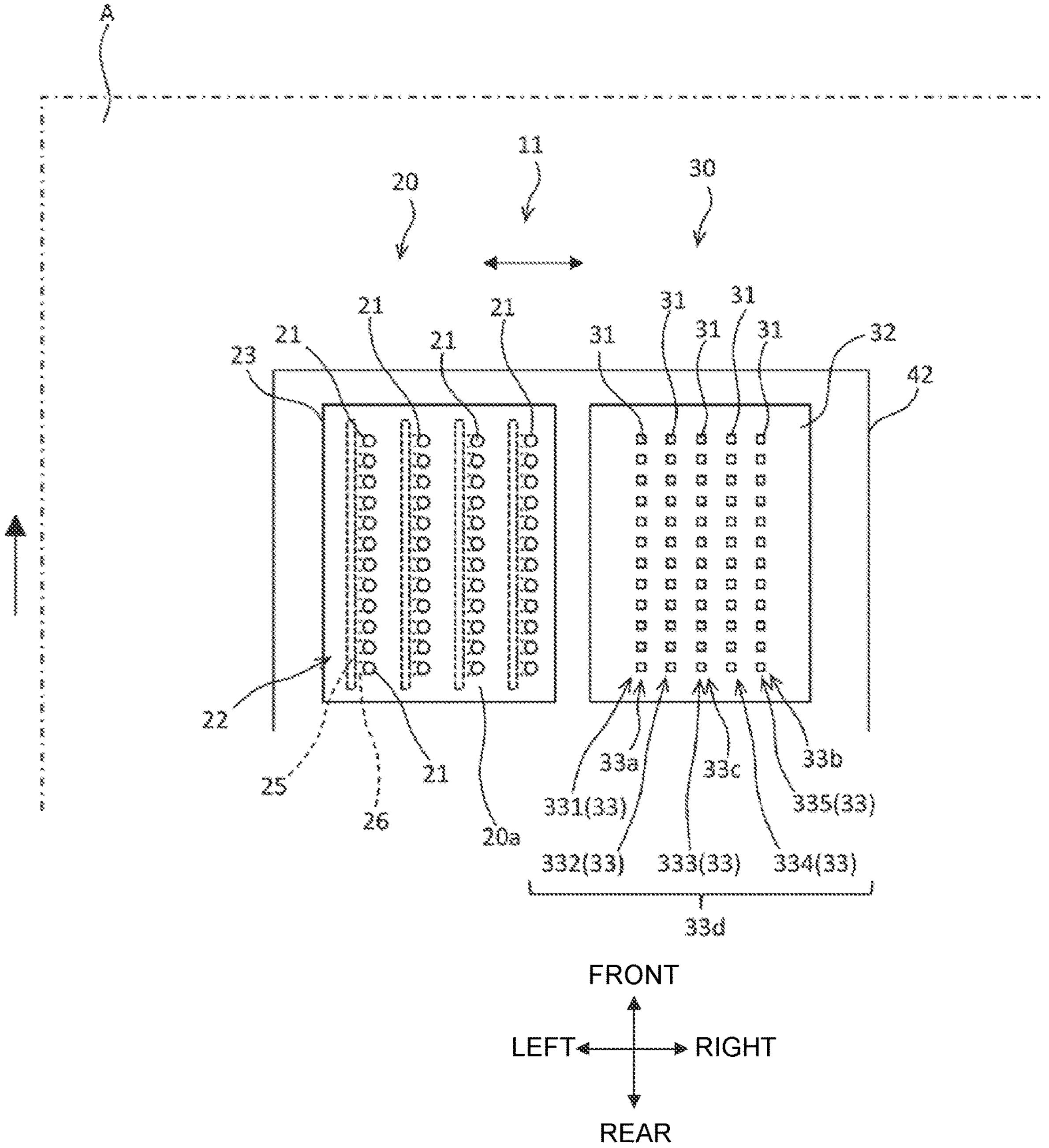
FIG. 3 is a schematic view seeing a head unit having odd number of light source rows from the below.

As depicted in FIG. 3, the head unit 11 includes the head 20 and the irradiating part 30. The head 20 includes a plurality of nozzles 21, ink channel 22, a channel forming body 23, and a plurality of driving elements 24 (FIG. 2). The plurality of nozzles 21 constructs a nozzle row by being arranged along the front-rear direction with intervals. In the head 20, a plurality of first nozzle rows is arranged in the left-right direction with intervals.

The channel forming body 23 has, for example, a rectangular parallelopiped shape. The nozzles 21 and the ink channel 22 are formed in the channel forming body 23. The nozzles 21 are opened on the discharging surface 20*a* of the channel forming body 23. The ink channels 22 is connected to the tank 12 (FIG. 1), and the nozzles 21. The ink channel 22 has in a route between the tank 12 (FIG. 1) and the nozzles 21, a common channel 25 and a plurality of individual channels 26. The common channel 25 communicates with the tank 12. The common channel 25 extends in the channel forming body 23 along the front-rear direction and is connected to the plurality of individual channels 26. The plurality of individual channels 26 is connected to the common channel 25, and is respectively connected to the plurality of nozzles 21. Thus, the ink flows from the tank 12 to the common channel 25, and is distributed to the individual channels 26 while flowing in the front-rear direction in the common channel 25, and then, is supplied to the nozzles 21.

Each of the driving elements 24 is a piezoelectric element etc., is provided corresponding to the individual channel 26, and is configured to drive so as to vary the volume of the individual channel 26. By the driving of the driving element 24, a pressure for discharging the ink from the nozzle 21 is applied to the ink in the individual channel 26, and the ink discharged from the nozzle 21 lands on the printing medium A. Note that the driving element 24 is not limited to the piezoelectric element. For example, a thermal actuator such as a heating resistor for generating bubbles, an electrostatic actuator such as an electrode for generating an electrostatic force etc. may be used as the driving element 24.

The irradiating part 30 is arranged upstream of the head 20 in a direction in which the head 20 moves while discharging the ink. For example, the head 20 discharges the ink in a case that the head 20 moves leftward, and does not discharge the ink in a case that the head 20 moves rightward. In such a case, the irradiating part 30 is arranged in the right of the head 20, that is at a position upstream of the head 20 with respect to leftward movement during ink discharging. Thus, the irradiating part 30 irradiates the ink on the printing medium A with a light, while moving following the head 20 which discharges the ink onto the printing medium A.

The irradiating part 30 includes a plurality of light sources 31, and a circuit board 32 on which the plurality of light sources 31 is mounted. The circuit board 32 includes, for example, a plate made of insulating material, and trace made of conductor arranged on the lower surface of the plate. The light sources 31 are connected to the trace. Each of the light sources 31 is a light emitting element such as, for example, a LED, and is configured to emit a light (for example, an ultraviolet ray or an infrared ray) for curing the inks discharged from the nozzles 21 by being driven by the controller 60. The plurality of light sources 31 is arranged along the front-rear direction with intervals so as to construct a light source row 33.

In the irradiating part 30, a plurality of light source rows 33 is arranged in the left-right direction with intervals. In the example of FIG. 3, a first light source row 331, a second light source row 332, a third light source row 333, a fourth light source row 334 and a fifth light source row 335 are arranged in this order from the left. The first light source row 331 is a first end light source row 33*a* provided at the left end (that is, one end in the left-right direction) among the plurality of light source rows 33. In the left-right direction, the first light source row 331 does not have the light source row 33 adjacent from the left to the first light source row 331, and is adjacent to the second light source row 332 in right of the first light source row 331. The fifth light source row 335 is a second end light source row 33*b* provided at the right end (that is, the other end in the left-right direction) among the plurality of light source rows 33. In the left-right direction, the fifth light source row 335 does not have the light source row 33 adjacent from the right to the fifth light source row 335, and is adjacent to the fourth light source row 334 on the left of the fifth light source row 335. The third light source row 333 is a central light source row 33*c* provided at the center between the first light source row 331 and the fifth light source low 335 in the left-right direction, and is arranged at the center in the left-right direction among the plurality of light source rows 33. Regarding the plurality of light source rows 33, the number of the light source rows 33 provided in right of the third light source row 333 and the number of the light source rows 33 provided in left of the third light source row 333 are identical to each other.

<Controller>

As depicted in FIG. 2, the controller 60 is a computer configured to control each part of the printing apparatus 10, and includes an interface 61, a calculating unit 62, and a memory unit 63. The interface 61 is configured to receive various data such as image data etc. from an external device B such as a computer, a camera, a communication network, a storage medium, display and a printer etc. The image data is a data indicating an image to be printed on the printing medium A, and is for example a raster data. Note that the controller 60 may be configured by single device, or may be configured by multiple devices located dispersedly and organized to cooperate for executing operations of the controller 60.

The memory unit 63 is a memory to which the calculating unit 62 can access. The memory unit 63 is configured by RAM, ROM and the like. The RAM stores various data such as an image data temporarily. The ROM stores a program for executing various data processing, a predetermined data, and the like.

The calculating unit 62 is configured by a processor such as CPU and the like, for example. If the calculating unit 62 executes the program stored in the ROM, then the controller controls the driving elements 24, the light sources 31, the moving motor 44, and the conveying motor 54 so as to execute processing of printing the image on the printing medium A.

Further, the controller 60 may be electrically connected to an input device 13. The input device 13 may be a button, a mouse and the like, and is configured to input information to the controller 60 by being operated by a user. Note that the input device 13 may be a touch panel integrated into a display device. The input device 13 may be the interface 61 to which information is inputted from outsides.

The controller 60 having such configuration is connected to the driving elements 24 in the head 20 via the head driving circuit 64 so as to control driving of the driving elements 24. Thus, discharging timings, discharging amounts, and the like of the inks discharged from the head 20 by the driving elements 24 are controlled. Further, the controller 60 is connected to the light sources 31 of the irradiating part 30 via the light source driving circuit 65 so as to control driving of the light sources 31. Thus, switching on (turning on) and switching off (turning off) of the light sources 31 are controlled.

The controller 60 is connected to the moving motor 44 of the moving device 40 via the moving driving circuit 66 so as to control driving of the moving motor 44. Thus, moving of the head 20 and the irradiating part 30 by the moving device 40 is controlled. The controller 60 is connected to the conveying motor 54 of the conveying device 50 via the conveying driving circuit 67 so as to control driving of the conveying motor 54. Thus, conveying of the printing medium A by the conveying device 50 is controlled.

<Control Method of Printing Apparatus>

Figure 4:
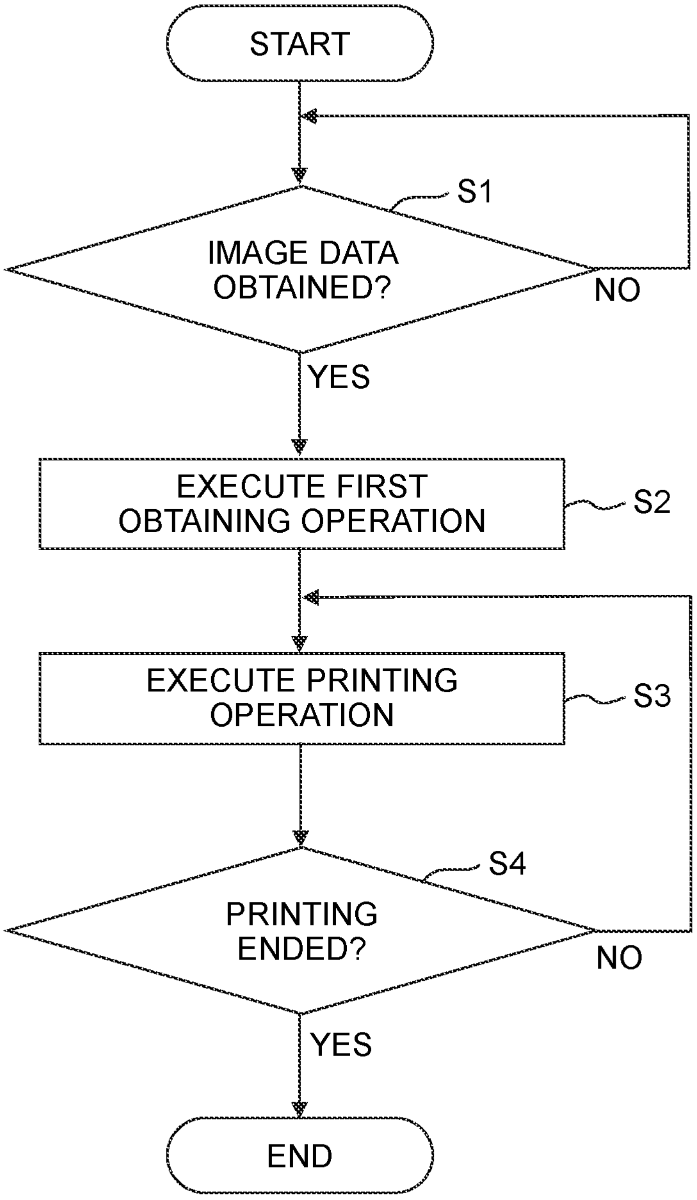
FIG. 4 is a flowchart indicating an example of a method for controlling a printing apparatus.

A control method of the printing apparatus is executed by the controller 60, for example, in accordance with the flowchart depicted in FIG. 4. Here, in a case that the controller obtains an image data (step S1: YES), the controller 60 executes a first obtaining operation of obtaining an irradiation gap (step S2), the irradiating gap being a gap between the irradiating part 30 and the printing medium A. The irradiating gap is a distance between the irradiating part and the printing medium A in the up-down direction, and is obtained, for example, by the controller 60 based on information on a shape of the printing medium A.

The information on the shape of the printing medium A includes a height in the up-down direction between the lower surface and the upper surface of the printing medium A. The information on the shape of the printing medium A may be input to the controller 60 from the external device B or the input device 13. The controller 60 obtains the positions in the up-down direction of the platen 51 and the irradiating part 30 from the memory unit 63 and the like. Then, the controller 60 obtains the irradiating gap between the printing medium A mounted on the platen 51 and the irradiating part 30 based on the positions of the platen 51 and the irradiating part 30 and the height of the printing medium A. Note that in a case that the printing apparatus 10 includes a sensor, the sensor may measure a distance to the upper surface of the printing medium A. In such a configuration, the controller 60 may obtain the irradiating gap between the irradiating part 30 and the printing medium A based on the distance measured by the sensor and the position of the irradiating part 30.

Then, the controller 60 executes the printing operation of printing an image on the printing medium A by the ink (step S3). In the printing operation, the controller 60 executes path processing and conveying processing alternately. In the path processing, the controller 60 executes a discharging operation and an irradiating operation concurrently with a moving operation of moving the head 20 and the irradiating part 30 in the left-right direction. In the discharging operation, the controller 60 cause the head 20 to discharge the ink to the printing medium A. In the irradiating operation, the controller 60 cause the irradiating part 30 to irradiate the ink on the printing medium A with the light from the irradiating part 30.

In the path processing, if the head 20 discharges the inks via nozzles 21 of the head while moving leftward, then the inks land the printing medium A. Then, the irradiating part irradiates the ink on the printing medium A with the light from the irradiating part 30 while moving leftward. The ink cures owing to the light with which the ink is irradiated, and is fixed to the printing medium A, and consequently an image by the ink is printed on the printing medium A.

In the irradiating operation, larger the irradiating gap being a distance between the printing medium A and the irradiating part 30 is, smaller a luminance (mW/cm 2) of the light, from the irradiating part 30, with which the printing medium A is irradiated in a unit time is. Thus, the controller 60 switches on the first end light source row 33*a*, the second end light source row 33*b*, and the central light source row 33*c* in a case that the irradiating gap is a first predetermined gap. Further, the controller 60 switches on the first end light source row 33*a* and the second end light source row 33*b*, and switches off at least one of the central light source row 33*c* in a case that the irradiating gap is a second predetermined gap smaller than the first predetermined gap.

In the example of FIG. 3, in a case that the irradiating gap is large, that is the irradiating gap is the first predetermined gap, the controller 60 switches on all of the light source rows 33 of the irradiating part 30, that is the first light source row 331 to the fifth light source row 335. By doing so, all light sources 31 of the first light source row 331 being the first end light source row 33*a*, all light sources 31 of the fifth light source row 335 being the second end light source row 33*b*, and all light sources 31 of the third light source row 333 being the central light source row 33*c* are switched on.

As described above, the number of the light sources 31 being switched on is larger in a case that the irradiating gap is the first predetermined gap as compared with the number in a case that the irradiating gap is the second predetermined gap. Thus, an intensity of the light emitted from the irradiating part 30 is larger in a case that the irradiation gap is the first predetermined gap as compared with the intensity in a case that the irradiation gap is the second predetermined gap. Consequently, even in a case that the irradiating gap is large, the ink on the printing medium A can be cured by the light avoiding a case that luminance of the light with which the printing medium A is irradiated is too small.

On the other hand, in a case that the irradiating gap is the second predetermined gap, that is the irradiating gap is small, the controller 60 switches off all of the light sources 31 of the third light source row 333 and switches on all light sources 31 of the light source rows 33 other than the third light source row 333. By doing so, all light sources 31 of the first light source row 331 being the first end light source row 33*a*, and all light sources 31 of the fifth light source row 335 being the second end light source row 33*b* are switched on, and all light sources 31 of the third light source row 333 being the central light source row 33*c* are switched off.

As described above, by switching off the central light source row 33*c*, it is possible to reduce thermal deterioration caused due to the emission of the light sources 31 of the central light source row 33*c* themselves. Further, the irradiating part 30 has a thermal distribution in which closer to the center of the irradiating part 30 is, higher the temperature is. Thus, due to such thermal distribution, the central light source row 33*c* is more likely to deteriorate thermally as compared with the first end light source row 33*a* and the second end light source row 33*b*. In view of such situation, if the central light source row 33*c* is switched off, the temperature at the center of the irradiating part 30 is reduced, and consequently thermal deterioration of the light sources 31 of the central light source row 33*c* can be reduced. Thus, a replacement of the irradiating part 30 is reduced, and a lifetime of the irradiating part 30 can be prolonged.

Further, in a case that the irradiating gap is the second predetermined gap, the number of light sources 31 being switched on is smaller than the number in a case that the irradiating gap is the first predetermined gap. Thus, it is possible to reduce energy consumption by the irradiating part 30. Further, the intensity of the light emitted by the irradiating part 30 is reduced in a case that the irradiating gap is the second predetermined gap, as compared with the intensity in a case that the irradiating gap is the first predetermined gap. Thus, even if the irradiating gap is small, thermal deterioration of the printing medium A due to the light is reduced by avoiding a case in which the illuminance of the light with which the printing medium A is irradiated is too great.

Further, in a case that the irradiating gap is the second predetermined gap, the light sources 31 of the first light source row 331, the second light source row 332, the fourth light source row 334 and the fifth light source row 335 are switched on. By doing so, a total light amount (mJ/cm$^2$) of the light from the irradiating part 30 with which the printing medium A is irradiated reaches not less than the total light amount enough to cure the ink on the printing medium A. Thus, even if the light sources 31 of a part of the light source rows 33 of the irradiating part 30 are switched off, the ink on the printing medium A can be cured. Note that light sources 31 of at least one of the second light source row 332 and the fourth light source row 334 may be switched off provided that the ink on the printing medium A can be cured.

Then, in the conveying processing, the controller 60 conveys the printing medium A frontward. By doing so, the image formed in the previous path processing executed prior to the current conveying processing is moved frontward. Then, in the current path processing to be executed after the current conveying processing, an image is formed on an area in rear of the image formed in the previous path processing. In such a manner, images are successively printed on the printing medium A in the path processing by repeating the path processing and the conveying processing in the printing operation of step S3, until all of the image based on the image data has been printed (step S4: NO). Then, if all of the image based on the image data has been printed, the printing is ended (step S4: YES).

Note that in the example of FIG. 3, the number of the light source rows 33 of the irradiating part 30 is odd number, one row, that is the third light source row 333 arranged at the center of the plurality of light source rows 33 is designated to be the central light source row 33*c*. In contrast, in a case that the number of light source rows 33 of the irradiating part 30 is even number, two light source rows 33 arranged at the center of the plurality of light source rows 33 will be designated to be the central light source rows 33*c*.

Figure 5:
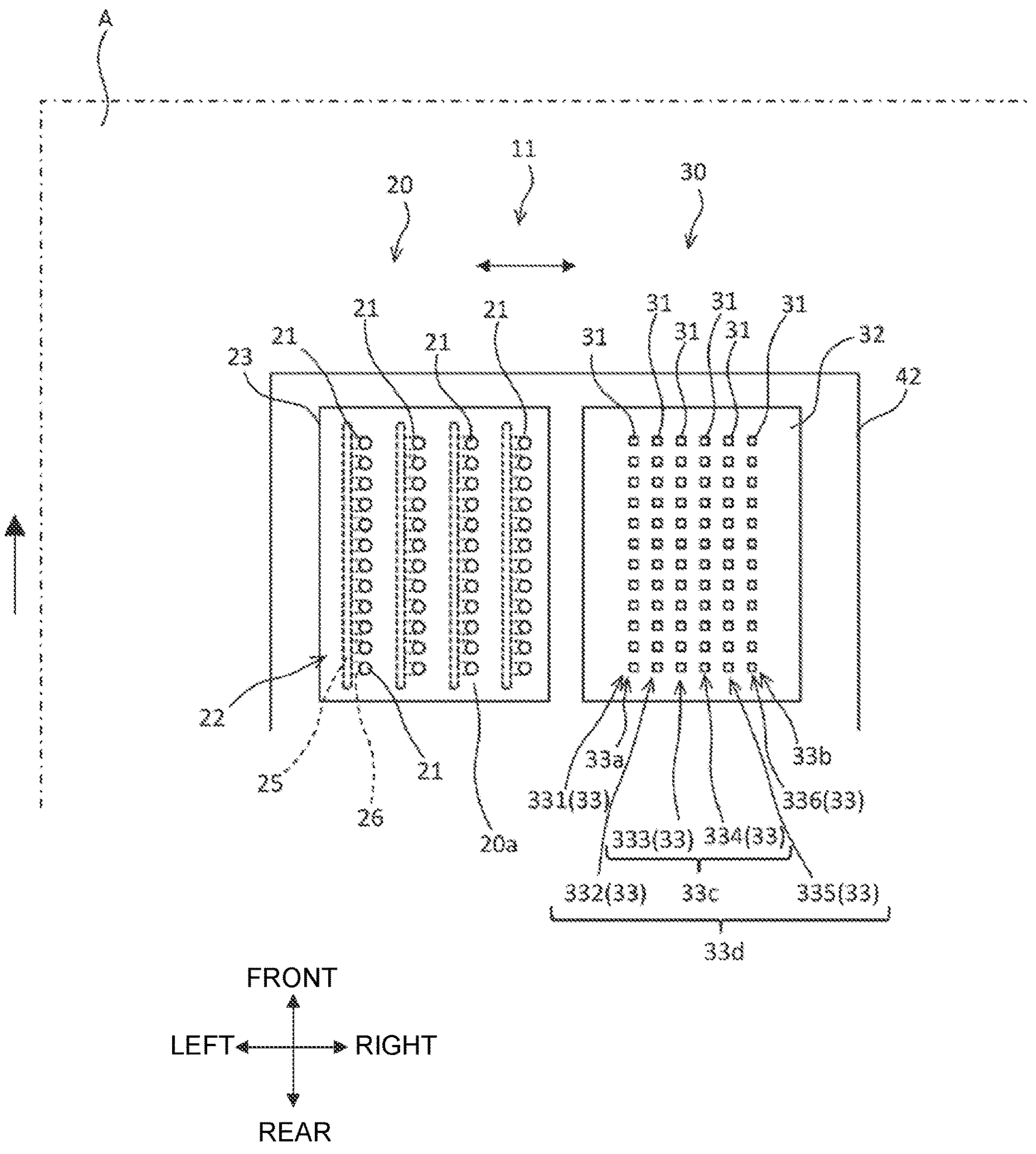
FIG. 5 is a schematic view seeing a head unit having even number of light source rows from the below.

For example, in a case of the configuration depicted in FIG. 5, the irradiating part 30 includes the first light source row 331, the second light source row 332, the third light source row 333, the fourth light source row 334, the fifth light source row 335 and the sixth light source row 336 arranged in this order from the left. In such a case, the third light source row 333 and the fourth light source row 334, of the first light source row 331 to sixth light source row 336, arranged at the center of those light source rows are the central light source rows 33*c*. Among the first light source row 331 to the sixth light source rows 336, the number of light source rows 33 arranged in left of the third light source row 333 and the fourth light source row 334 is identical to the number of light source rows 33 arranged in right of the third light source row 333 and the fourth light source row 334. The first light source row 331 is the first end light source row 33*a* and the sixth light source row 336 is the second end light source row 33*b*.

In the irradiating operation of the example of FIG. 5, in a case that the irradiating gap is the first predetermined gap, the controller 60 switches on the first light source row 331 being the first end light source row 33*a*, a sixth light source row 336 being the second end light source row 33*b*, and the third light source row 333 and the fourth light source row 334 being the central light source rows 33*c*. For example, the controller 60 switches on the first light source row 331 to the sixth light source row 336. Further, in a case that the irradiating gap is the second predetermined gap smaller than the first predetermined gap, the controller 60 switches on the first end light source row 33*a* and the second end light source row 33*b* and switches off at least one of the central light source rows 33*c*. For example, the controller 60 switches off at least one of light source rows 33 of the third light source row 333 and the fourth light source row 334, and switches on remaining light source rows 33 of the first light source row 331 to the sixth light source row 336. By doing so, the lifetime of the irradiating part 30 is prolonged.

Second Embodiment

The printing apparatus 10 according a second embodiment of the present disclosures includes, as depicted in the example of FIG. 1 and FIG. 2, a head 20 having a plurality of nozzles 21 configured to discharge a photo-curing ink onto a printing medium A, an irradiating part 30 having a plurality of light source rows 33 configured to irradiate the ink on the printing medium A with a light, a moving device 40 configured to move the head 20 and the irradiating part 30 in the first direction, the conveying device 50 configured to convey the printing medium A in the second direction crossing the first direction, and the controller 60. Each of the plurality of light source rows 33 is configured by the plurality of light sources 31 arranged or aligned along the second direction. The plurality of light source rows 33 is arranged in the first direction and includes the first end light source row 33*a* and the second end light source row 33*b* arranged at both ends in the first direction, and a plurality of middle light source rows 33*d* provided between the first end light source row 33*a* and the second end light source row 33*b*. The controller 60 executes the first obtaining operation of obtaining the gap between the irradiating part 30 and the printing medium A, and the printing operation of printing the image onto the printing medium A by the ink. In the printing operation, the controller 60 executes path processing and conveying processing alternately. In the path processing, the controller 60 causes the head 20 to discharge the ink to the printing medium A and cause the irradiating part 30 to irradiate the ink on the printing medium A with the light from the irradiating part 30 while moving the head 20 and the irradiating part 30 in the first direction. In the conveying processing, the controller 60 cause the conveying device 50 to convey the printing medium A in the second direction. In the path processing, the controller 60 switches on the first end light source row 33*a*, the second end light source row 33*b*, and the plurality of middle light source rows 33*d* in a case that the gap is the first predetermined gap. Meanwhile, in a case that the gap is the second predetermined gap smaller than the first predetermined gap, the controller 60 switches on the first end light source row 33*a* and the second end light source row 33*b*, and switches on a part of the middle light source rows 33*d*, while changing the middle light source row(s) to be switched on for each of the path processing, and switches off the remaining of the middle light source rows 33*d* (that is, the middle light source row(s) 33*d* other than the middle light source row(s) to be switched on).

Specifically, in the example depicted in FIG. 3, the first light source row 331, the second light source row 332, the third light source row 333, the fourth light source row 334, and the fifth light source row 335 are arranged in this order from the left, in the irradiating part 30. In such a case, the first light source row 331 is the first end light source row 33*a*, and the fifth light source row 335 is the second end light source row 33*b*. Further, all of the light source rows 33 arranged between the first light source row 331 and the fifth light source row 335, that is the second light source row 332, the third light source row 333 and the fourth light source row 334 are the middle light source rows 33*d*. In the irradiating part 30, the light source row 33 arranged in left of the middle light source rows 33*d* is the first end light source row 33*a* and the light source row 33 arranged in right of the middle light source rows 33*d* is the second end light rouse row 33*b*. The middle light source rows 33*d* include the central light source row 33*c*.

A control method of the printing apparatus 10 is executed by, for example, the controller 60 in accordance with the flow chart depicted in FIG. 4. Here, if the controller obtains an image data (step S1: YES), the controller 60 executes a first obtaining operation (step S2), and then executes a printing operation (step S3). In the printing operation, the controller 60 executes path processing and conveying processing alternately. In the path processing, the controller 60 executes a discharging operation and an irradiating operation concurrently with a moving operation of moving the head 20 and the irradiating part 30 in the left-right direction. In the discharging operation, the controller 60 causes the head 20 to discharge the ink to the printing medium A. In the irradiating operation, the controller 60 causes the irradiating part 30 to irradiate the ink on the printing medium A with the light from the irradiating part 30.

In the irradiating operation, the controller 60 controls, for each light source row 33 and for each path, switching on and off of the light sources 31 depending on the irradiating gap between the irradiating part 30 and the printing medium A. In the example depicted in FIG. 3, in a case that the irradiating gap obtained in the first obtaining operation is the first predetermined gap, that is large, the controller 60 switches on the light sources 31 of all of the first light source row 331 to the fifth light source row 335 of the irradiating part 30. By doing so, the ink on the printing medium A is cured, because the number of the light source 31 being switched on is large.

On the other hand, in a case that the irradiating gap is the second predetermined gap smaller than the first predetermined gap, the controller 60 switches on all of the light sources 31 of the first light source row 331 being the first end light source row 33*a* and all of the light sources 31 of the fifth light source row 335 being the second end light source row 33*b*, among all of the light source rows 33 of the irradiating part 30. Further, the controller 60 switches on all of the light sources 31 of a part of the middle light source rows 33*d* being the second light source row 332 to the fourth light source row 334, and switches off all of the light sources 31 of the remaining of the middle light source rows 33*d*. The controller 60 changes the middle light source row 33*d* to be switched on for each path processing.

For example, in the first path processing, the controller 60 switches on all of the light sources 31 in the second light source row 332 of the middle light sources 33*d*, and switches off all of the light sources 31 in the third light source row 333 and the fourth light source row 334. Thus, in the first path processing, all of the light sources 31 in the first light source row 331, the second light source row 332 and the fifth light source row 335 are switched on, and the irradiating part 30 irradiates the ink on the printing medium A with the light. Then, in the second path processing just after (directly next to) the first path processing, the controller 60 switches on all of the light sources 31 in the third light source row 333 of the middle light sources 33*d*, and switches off all of the light sources 31 in the second light source row 332 and the fourth light source row 334. Thus, in the second path processing, all of the light sources 31 in the first light source row 331, the third light source row 333 and the fifth light source row 335 are switched on, and the irradiating part 30 irradiates the ink on the printing medium A with the light. Then, in the third path processing just after (directly next to) the second path processing, the controller 60 switches on all of the light sources 31 in the fourth light source row 334 of the middle light sources 33*d*, and switches off all of the light sources 31 in the second light source row 332 and the third light source row 333. Thus, in the third path processing, all of the light sources 31 in the first light source row 331, the fourth light source row 334 and the fifth light source row 335 are switched on, and the irradiating part 30 irradiates the ink on the printing medium A with the light.

In such a manner, by switching off a part of the middle light source rows 33*d* in order or by turns, it is possible to reduce thermal deterioration caused due to light emission of the light sources 31 in the middle light source row 33*d* themselves. Further, owing to a thermal distribution of the irradiating part 30 in which the center part has higher temperature as compared with other parts, the middle light source rows 33*d* are more likely to suffer thermal deterioration as compared with the first end light source row 33*a* and the second end light source row 33*b*. In view of such situation, the temperature at the center area of the irradiating part 30 can be reduced by switching off one of the middle light source rows 33*d* in turns, and consequently it is possible to reduce thermal deterioration of the light sources 31 in the middle light source rows 33*d*. Thus, it is possible to reduce replacement of the irradiating part 30 and prolong a life time of the irradiating part 30.

Further, in a case that the irradiating gap is the second predetermined gap, it is possible to reduce energy consumed in the irradiating part 30, because the number of the light sources 31 to be switched on is smaller as compared with the number in a case that the irradiating gap is the first predetermined gap. Further, in a case that the irradiating gap is the second predetermined gap, thermal deterioration of the printing medium A due to the light can be reduced, because an intensity of the light emitted from the irradiating part 30 is smaller as compared with a case that the irradiating gap is the first predetermined gap.

Note that in examples described above, the controller 60 switches on one light source row 33 of the middle light source rows 33*d* of the irradiating part 30, and switches off all other light source rows 33 of the middle light source rows 33*d* of the irradiating part 30, in a case that the irradiating gap is the second predetermined gap. However, the number of the light source rows 33 to be switched on is not limited to one, provided that the light source row to be switched on is a part of the middle light source rows 33*d*. For example, the controller 60 may switch on two or more light source rows 33 of the middle light source rows 33*d*, and switch off all other light source row(s) 33 of the middle light source rows 33*d*.

Further, in the example described above, in a case that the irradiating gap is the second predetermined gap, the controller 60 changes the middle light source row 33*d* to be switched on for each path in the order of their arrangement. However, the order of switching on the middle light source row 33*d* is not limited thereto. For example, the controller 60 may change the middle light source row 33*d* to be switched on for each path such that the number of times of switching on the central light source row 33*c*, of the middle light source rows 33*d*, which is likely to suffer thermal deterioration, is smaller than the number of times of switching on the middle light source row 33*d* other than the central light source row 33*c*.

Third Embodiment

The printing apparatus according a third embodiment of the present disclosure includes, as depicted in the example of FIG. 1 and FIG. 2, a head 20 having a plurality of nozzles 21 configured to discharge a photo-curing ink onto a printing medium A, an irradiating part 30 having a plurality of light source rows 33 configured to irradiate the ink on the printing medium A with a light, a moving device 40 configured to move the head 20 and the irradiating part 30 in the first direction, the conveying device 50 configured to convey the printing medium A in the second direction crossing the first direction, and the controller 60. Each of the plurality of light source rows 33 is configured by the plurality of light sources 31 arranged or aligned along the second direction, and the plurality of light source rows 33 is arranged in the first direction. The controller 60 executes the first obtaining operation of obtaining the gap between the irradiating part 30 and the printing medium A, and the printing operation of printing the image onto the printing medium A by the ink. In the printing operation, the controller 60 executes path processing and conveying processing alternately. In the path processing, the controller 60 causes the head 20 to discharge the ink to the printing medium A and causes the irradiating part 30 to irradiate the ink on the printing medium A with the light from the irradiating part 30 while moving the head 20 and the irradiating part 30 in the first direction. In the conveying processing, the controller 60 causes the conveying device 50 to convey the printing medium A in the second direction. In the path processing, in a case that the gap is the second predetermined gap smaller than the first predetermined gap, the controller 60 reduces the number of the light source rows 33 to be switched on, and change the light source row(s) 33 to be switched on for each path processing.

A control method of the printing apparatus 10 is executed by the controller 60 in accordance with, for example, the flow chart depicted in FIG. 4. Here, if the controller 60 obtains an image data (step S1: YES), the controller 60 executes a first obtaining operation (step S2), and then executes a printing operation (step S3). In the printing operation, the controller 60 executes path processing and conveying processing alternately. In the path processing, the controller 60 executes a discharging operation and an irradiating operation concurrently with a moving operation of moving the head 20 and the irradiating part 30 in the left-right direction. In the discharging operation, the controller 60 causes the head 20 to discharge the ink to the printing medium A. In the irradiating operation, the controller 60 causes the irradiating part 30 to irradiate the ink on the printing medium A with the light from the irradiating part 30.

In the irradiating operation, the controller 60 controls, for each light source row 33 and for each path, switching on and off of the light sources 31 depending on the irradiating gap between the irradiating part 30 and the printing medium A. In the example depicted in FIG. 5, in a case that the irradiating gap is the first predetermined gap, that is large, the controller 60 switches on the light sources 31 in all of the first light source row 331 to the sixth light source row 336 of the irradiating part 30. By doing so, the ink on the printing medium A is cured, because the number of the light source 31 being switched on is large.

On the other hand, in a case that the irradiating gap is the second predetermined gap, that is the irradiating gap is smaller than the first predetermined gap, the controller 60 switches on all of the light sources 31 of a part of the light source rows 33 among all of the light source rows 33 of the irradiating part 30, and switches off all of the light sources 31 of the remaining light source row(s) 33. The controller 60 changes the light source row(s) 33 to be switched on for each path processing.

For example, in the first path processing, the irradiating part 30 irradiates the ink on the printing medium A with the light in a state that all of the light sources 31 in the first light source row 331 and the second light source row 332 are switched on, and all of the light sources 31 in the third light source row 333 to the sixth light source row 336 are switched off. Then, in the second path processing just after (directly next to) the first path processing, the irradiating part 30 irradiates the ink on the printing medium A with the light in a state that all of the light sources 31 in the third light source row 333 and the fourth light source row 334 are switched on, and all of the light sources 31 in the first light source row 331, the second light source row 332, the fifth light source row 335 and the sixth light source row 336 are switched off. Then, in the third path processing just after (directly next to) the second path processing, the irradiating part irradiates the ink on the printing medium A with the light in a state that all of the light sources 31 in the fifth light source row 335 and the sixth light source row 336 are switched on, and all of the light sources 31 in the first light source row 331 to the fourth light source row 334 are switched off.

In such a manner, by switching off a part of the light source rows 33 of the irradiating part 30 in order or by turns, it is possible to reduce thermal deterioration caused due to light emission of the light sources 31 in the light source row 33 switched off themselves. Further, owing to a thermal distribution of the irradiating part 30 in which the temperature rises as a position approaches the center, the light source row 33 closer to the center of the irradiating part is more likely to suffer thermal deterioration. In view of such situation, the temperature at the center area of the irradiating part 30 can be reduced by switching off some of the light source row 33 in turns. Thus, it is possible to reduce replacement of the irradiating part 30 and prolong a life time of the irradiating part 30.

Further, in a case that the irradiating gap is the second predetermined gap, it is possible to reduce energy consumed in the irradiating part 30, because the number of the light sources 31 to be switched on is smaller as compared with the number in a case that the irradiating gap is the first predetermined gap. Further, in a case that the irradiating gap is the second predetermined gap, thermal deterioration of the printing medium A due to the light can be reduced, because an intensity of the light emitted from the irradiating part 30 is smaller as compared with an intensity in a case that the irradiating gap is the first predetermined gap.

Note that in the above examples, in a case that the irradiating gap is the second predetermined gap, the controller 60 switches on two light source rows 33 among the light source rows 33 of the irradiating part 30, and switches off other light source rows 33 of the irradiating part 30. However, the number of the light source row 33 to be switched on is not limited to two, and may be one or not less than three, provided that the light source row(s) to be switched on is a part of the light source rows 33 of the irradiating part 30.

Further, in the example described above, in a case that the irradiating gap is the second predetermined gap, the controller 60 switches on two light source rows 33 adjacent to each other in the left-right direction, among the light source rows 33 of the irradiating part 30. However, an arrangement of the light source row(s) 33 to be switched on is not limited to light source rows 33 adjacent to each other, provided that the light source row(s) to be switched on is a part of the light source rows 33 of the irradiating part 30. For example, a light source row 33 to be switched off may be interposed between two light source rows 33 to be switched on.

Further, in the example described above, in a case that the irradiating gap is the second predetermined gap, the controller 60 changes the light source row 33 to be switched on for each path in the order of their arrangement. However, the order of switching on the light source row(s) 33 is not limited thereto. For example, the controller 60 may change the light source row(s) 33 to be switched on for each path such that the number of times of switching on a certain light source row 33 close to the center is smaller than the number of times of switching on light source rows 33 other than the certain light source row 33, the certain light source row 33 being likely to suffer thermal deterioration in terms of a thermal distribution.

Fourth Embodiment

The printing apparatus 10 according a fourth embodiment of the present disclosure includes, as depicted in FIG. 1 and FIG. 2, a head 20 having a plurality of nozzles 21 configured to discharge a photo-curing ink onto a printing medium A, an irradiating part 30 having a plurality of light source rows 33 configured to irradiate the ink on the printing medium A with a light, a moving device 40 configured to move the head 20 and the irradiating part 30 in the first direction, the conveying device 50 configured to convey the printing medium A in the second direction crossing the first direction, and the controller 60. Each of the plurality of light source rows 33 is configured by the plurality of light sources 31 arranged or aligned along the second direction, and the plurality of light source rows 33 is arranged in the first direction. The controller 60 executes the first obtaining operation of obtaining the gap between the irradiating part 30 and the printing medium A, a second obtaining operation of obtaining temperature information of the irradiating part 30, and the printing operation of printing the image onto the printing medium A by the ink. In the printing operation, the controller 60 executes path processing and conveying processing alternately. In the path processing, the controller 60 causes the head 20 to discharge the ink to the printing medium A and cause the irradiating part 30 to irradiate the ink on the printing medium A with the light from the irradiating part 30 while moving the head 20 and the irradiating part 30 in the first direction. In the conveying processing, the controller 60 causes the conveying device 50 to convey the printing medium A in the second direction. In the path processing, the controller 60 reduces the number of the light source rows 33 to be switched on as compared with the number in a case that the gap is the first predetermined gap, and decides light source row(s) 33 to be switched on based on the temperature information, in a case that the gap is the second predetermined gap smaller than the first predetermined gap.

Figure 6:
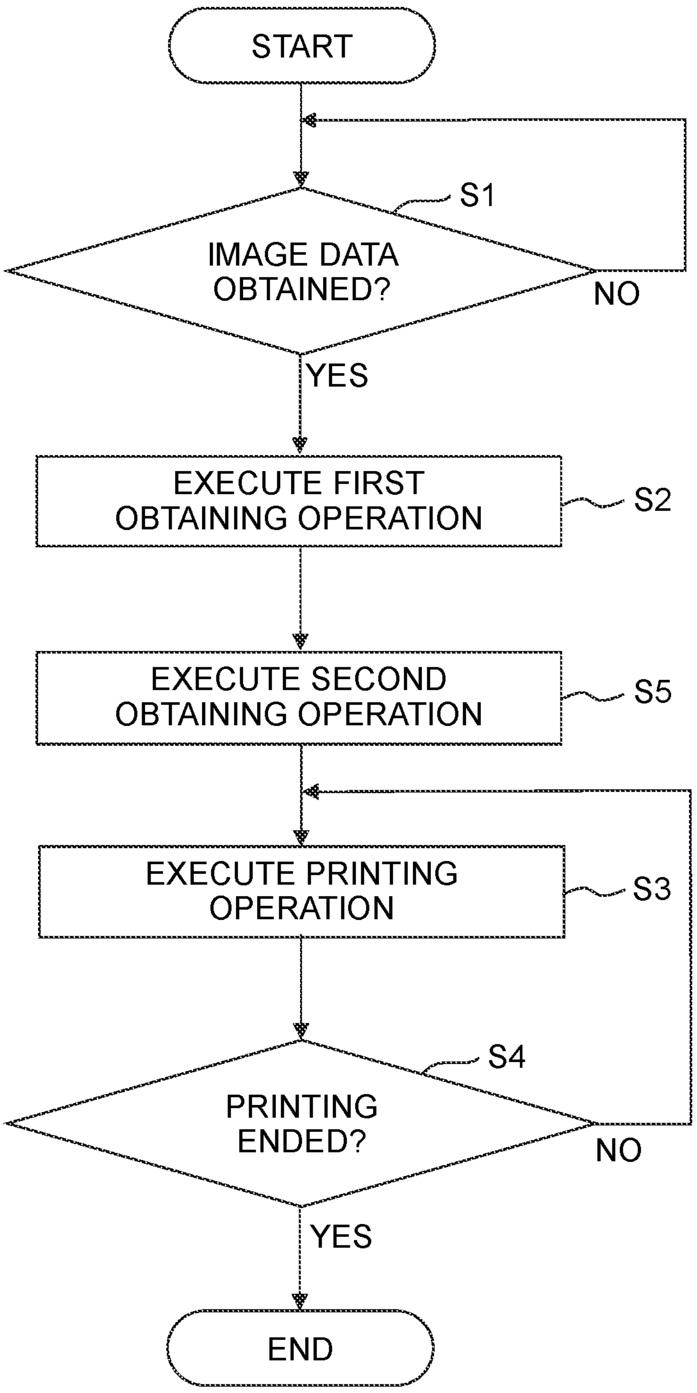
FIG. 6 is a flowchart indicating an example of a method for controlling a printing apparatus.

A control method for the printing apparatus 10 is executed by the controller 60 in accordance with, for example, the flow chart depicted in FIG. 6. In the flow chart, a process of a step S5 is executed by the controller 60 between the process of the step S2 and the process of the step S3 in FIG. 4.

Specifically, if the controller 60 obtains an image data (step S1: YES), then the controller 60 executes the first obtaining operation (step S2), and executes the second obtaining operation (step S5). In the second obtaining operation, the controller 60 obtains temperature information on the irradiating part 30.

For example, temperature of the irradiating part 30 will rise by switching on the light sources 31 of the irradiating part 30 in the printing operation, and thus, the controller 60 obtains duration of switching on of the light sources 31 as the temperature information of the irradiating part 30 from the memory unit 63. The duration of switching on of the light sources 31 is, for example, the duration of switching on of the light sources 31 in all or predetermined times of printing operations having been executed prior to the present printing operation. The printing operations of predetermined times may be one or a plurality times of printing operations, of all of the printing operations, timely close to the present printing operation.

In this case, the controller 60 measures the duration of switching on, that is a time period from switching on of the light source 31 to the switching off of the light source 31 in which the light source 31 is being switched on, for each of the light source row 33, when controlling switching on and off of the light source 31 for each of the light source row 33. Then, the controller 60 adds up a measured time in a predetermined period for each of the light source row 33, and obtains the added up measured time for a certain light source row 33 as temperature information for the certain light source row 33, and store it in the memory unit 63. Longer the measured time is, longer the duration of switching on of the light source 31 of the light source row 33 is, and higher the temperature of the light source 31 is. The added up measured time is correlated to the temperature information so as to reflect such relationship.

Then the controller 60 executes a printing operation (step S3). In the printing operation, the controller 60 executes path processing and conveying processing alternately. In the path processing, the controller 60 executes a discharging operation and an irradiating operation concurrently with a moving operation of moving the head 20 and the irradiating part 30 in the left-right direction. In the discharging operation, the controller 60 causes the head 20 to discharge the ink to the printing medium A. In the irradiating operation, the controller 60 causes the irradiating part 30 to irradiate the ink on the printing medium A with the light from the irradiating part 30.

In the irradiating operation, the controller 60 controls, for each light source row 33 and for each path, switching on and off of the light sources 31 depending on the irradiating gap between the irradiating part 30 and the printing medium A. In the example depicted in FIG. 5, in a case that the irradiating gap is the first predetermined gap, that is large, the controller 60 switches on the light sources 31 in all of the first light source row 331 to the sixth light source row 336 of the irradiating part 30. By doing so, the ink on the printing medium A is cured, because the number of the light source 31 being switched on is large.

On the other hand, in a case that the irradiating gap is the second predetermined gap smaller than the first predetermined gap, the controller 60 switches on all of the light sources 31 of a part of the light source rows 33 of the irradiating part 30, and switches off all of the light sources 31 of other light source rows 33. The controller 60 decides a light source row(s) 33 to be switched on based on the temperature information obtained by the second obtaining operation of the step S5. For example, the controller 60 obtains the duration of switching on of the light source row 33 until the present printing operation from the temperature information, and make a decision such that a light source row 33 having low temperature, that is a light source row 33 of which duration of switching on is short, is switched on. Here, one or more light source row 33, sufficient to apply a total light amount capable of curing the ink, will be switched on.

In such a manner, by switching off the light source row(s) 33 having high temperature of the irradiating part 30, it is possible to reduce thermal deterioration caused due to light emission of the light sources 31 in the light source row 33 switched off themselves. Thus, it is possible to reduce replacement of the irradiating part 30 and prolong a life time of the irradiating part 30. Further, in a case that the irradiating gap is the second predetermined gap, it is possible to reduce energy consumed in the irradiating part 30, because the number of the light sources 31 to be switched on is smaller as compared with the number in a case that the irradiating gap is the first predetermined gap. Further, in a case that the irradiating gap is the second predetermined gap, thermal deterioration of the printing medium A due to the light can be reduced, because an intensity of the light emitted from the irradiating part 30 is smaller, as compared with an intensity in a case that the irradiating gap is the first predetermined gap.

Note that, in the example described above, the controller 60 decides, in a case that the irradiating gap is the second predetermined gap, a light source row 33 to be switched on, from all of the light source rows 33 of the irradiating part 30, based on the temperature information. However, the controller 60 may decide a light source row 33 to be switched on, from light source rows 33 other than the central light source row 33*c* among all of the light source rows 33 of the irradiating part 30, based on the temperature information. In such a case, all of the light sources 31 of the central light source row 33*c* that is likely to have high temperature is switched off irrelative of the temperature information, and thus, thermal deterioration of the central light source row 33*c* is reduced, and consequently a lifetime of the irradiating part 33 is prolonged.

Further, in the example described above, the controller 60 decides the light source row 33 to be switched on based on the temperature information in a case that the irradiating gap is the second predetermined gap. The controller 60 may decide the light source row 33 to be switched on based on the temperature information and the image data. In such a case, the controller 60 obtains the duration of switching on of the light source rows 33 until the present printing operation from the temperature information, and the duration of the switching on of the light sources 31 in the present printing operation from the image data. Then, the controller 60 may decide the light source row(s) 33 to be switched on for each one path or for each several paths, based on the duration of switching on until the present printing operation and the duration of switching on in the present printing operation, such that the durations of switching on of the light source rows 33 are even with each other.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Note that all embodiments described above may be combined with each other unless the embodiments contradict each other. Many improvements and other embodiments are clear to one of ordinary skills in the art in view of the above description. Thus, the above description should be interpreted as examples, and the above description is provided in order to teach one of ordinary skills in the art the best mode for executing the disclosure. Details of the structures and/or the functions can be substantially modified without deviating from the spirit of the disclosure.

In the above embodiments, the number of a plurality of light source rows 33 is five or six. However, there is no limitation thereto. The number of the plurality of light source rows 33 may be not more than four, or not less than seven.

The printing apparatuses of the embodiments are useful as a printing apparatus and the like capable of prolonging a lifetime of an irradiating part.

What is claimed is:

1. A printing apparatus comprising:

a head including a plurality of nozzles configured to discharge an ink having photo-curing property to a printing medium;

an irradiator including a plurality of light source rows configured to irradiate the ink on the printing medium with a light;

a carriage configured to move the head and the irradiator in a first direction; and a controller, wherein:

each of the plurality of light source rows is constructed by a plurality of light sources aligned in a second direction crossing the first direction;

the plurality of light source rows is arranged in the first direction;

the controller is configured to:

execute a first obtaining operation of obtaining a gap between the irradiator and the printing medium;

execute a discharging operation of discharging the ink from the head to the printing medium;

execute an irradiating operation of irradiating the ink on the printing medium with the light from the irradiator; and switch off a part of the plurality of light source rows in the irradiating operation in a case that the gap obtained in the first obtaining operation is a second gap; and a number of the plurality of light sources switched on in the irradiating operation in a case that the gap obtained in the first obtaining operation is a first gap is greater than a number of the plurality of light sources switched on in the irradiating operation in the case that the gap obtained in the first obtaining operation is the second gap smaller than the first gap.

2. The printing apparatus according to claim 1, wherein:

the plurality of light source rows includes a first end light source row positioned at a first end in the first direction of the plurality of light source rows, a second end light source row positioned at a second end in the first direction of the plurality of light source rows, and at least one middle light source row positioned between the first end light source row and the second end light source row; and the controller is configured to:

switch on the first end light source row, the second end light source row, and the at least one middle light source row in the irradiating operation in the case that the gap obtained in the first obtaining operation is the first gap; and switch on the first end light source row and the second end light source row, and switch off at least one of the at least one middle light source row in the irradiating operation in the case that the gap obtained in the first obtaining operation is the second gap.

3. The printing apparatus according to claim 2, wherein:

the at least one middle light source row includes at least one central light source row positioned at a center between the first end light source row and the second end light source row; and the controller is configured to switch on the first end light source row and the second end light source row, and switch off the at least one central light source row in the irradiating operation in the case that the gap obtained in the first obtaining operation is the second gap.

4. The printing apparatus according to claim 2, further comprising a conveyor configured to convey the printing medium in the second direction, wherein:

the at least one middle light source row is a plurality of middle light source rows;

the controller is configured to:

execute path processing of executing the discharging operation and the irradiating operation while moving the head and the irradiator in the first direction, and conveying processing of conveying the printing medium in the second direction, alternately;

switch on the first end light source row, the second end light source row, and the plurality of middle light source rows in the path processing in the case that the gap obtained in the first obtaining operation is the first gap;

switch on the first end light source row, the second end light source row and a part of the plurality of middle light source rows, and switch off remaining of the plurality of middle light source rows in the path processing in the case that the gap obtained in the first obtaining operation is the second gap; and change the part of the plurality of middle light source rows switched on for each of the path processing.

5. The printing apparatus according to claim 4, wherein the controller is configured to change the part of the plurality of middle light source rows switched on in an order of an arrangement of the plurality of middle light source rows.

6. The printing apparatus according to claim 4, wherein:

the plurality of middle light source rows includes at least one central light source rows positioned at a center between the first end light source row and the second end light source row; and the controller is configured to change the part of the plurality of middle light source rows switched on for each of the path processing such that a number of times of switching on the central light source row is smaller than a number of times of switching on the middle light source row other than the central light source row.

7. The printing apparatus according to claim 1, wherein the controller is configured to switch on all of the plurality of light source rows in the irradiating operation in the case that the gap obtained in the first obtaining operation is the first gap.

8. The printing apparatus according to claim 1, wherein a state in which one of the plurality of light source rows is switched on is a state in which all of the plurality of light sources constructing the one of the plurality of light source rows is switched on.

9. The printing apparatus according to claim 1, further comprising a conveyor configured to convey the printing medium in the second direction, wherein the controller is configured to:

execute a path processing of executing the discharging operation and the irradiating operation while moving the head and the irradiator in the first direction, and a conveying processing of conveying the printing medium in the second direction, alternately;

switch on a part of the plurality of light source rows, and switch off remaining of the plurality of light source rows in the path processing in the case that the gap obtained in the first obtaining operation is the second gap; and change the part of the plurality of light source rows switched on for each of the path processing.

10. The printing apparatus according to claim 9, wherein the part of the plurality of light source rows switched on is a plurality of light source rows adjacent to each other.

11. The printing apparatus according to claim 1, further comprising a conveyor configured to convey the printing medium in the second direction, wherein the controller is configured to:

execute a second obtaining operation of obtaining temperature information of the irradiator;

execute path processing of executing the discharging operation and the irradiating operation while moving the head and the irradiator in the first direction, and conveying processing of conveying the printing medium in the second direction, alternately;

switch on a part of the plurality of light source rows, and switch off remaining of the plurality of light source rows in the path processing in the case that the gap obtained in the first obtaining operation is the second gap; and determine the part of the plurality of light source rows switched on based on the temperature information.

12. The printing apparatus according to claim 11, wherein the controller is configured to obtain the temperature information based on duration of switching on of the plurality of light source rows.

13. The printing apparatus according to claim 11, wherein:

the plurality of light source rows includes a first end light source row positioned at a first end in the first direction of the plurality of light source rows, a second end light source row positioned at a second end in the first direction of the plurality of light source rows, and at least one central light source row positioned at a center between the first end light source row and the second end light source row; and the controller is configured to determine the part of the plurality of light source rows switched on, based on the temperature information, from the plurality of light source rows different than the central light source row.

14. The printing apparatus according to claim 11, wherein the controller is configured to determine the part of the plurality of light source rows switched on based on the temperature information and an image data.

15. A control method for a printing apparatus, the printing apparatus including:

a head including a plurality of nozzles configured to discharge an ink having photo-curing property to a printing medium;

an irradiator including a plurality of light source rows configured to irradiate the ink on the printing medium with a light;

a carriage configured to move the head and the irradiator in a first direction; and a controller, wherein:

each of the plurality of light source rows is constructed by a plurality of light sources aligned in a second direction crossing the first direction;

the plurality of light source rows is arranged in the first direction;

the method comprising:

causing the controller to execute a first obtaining operation of obtaining a gap between the irradiator and the printing medium;

causing the controller to execute a discharging operation of discharging the ink from the head to the printing medium;

causing the controller to execute an irradiating operation of irradiating the ink on the printing medium with the light from the irradiator; and causing the controller to switch off a part of the plurality of light source rows in the irradiating operation in a case that the gap obtained in the first obtaining operation is a second gap; and a number of the plurality of light sources switched on in the irradiating operation in a case that the gap obtained in the first obtaining operation is a first gap is greater than a number of the plurality of light sources switched on in the irradiating operation in the case that the gap obtained in the first obtaining operation is the second gap smaller than the first gap.

* * * * *